United States Patent [19]

Orthman

[11] 4,033,416

[45] July 5, 1977

[54] BLADE MEANS FOR ROW CROP THINNING MACHINE

[75] Inventor: Henry K. Orthman, Lexington, Nebr.

[73] Assignee: Orthman Manufacturing, Inc., Lexington, Nebr.

[22] Filed: Apr. 17, 1975

[21] Appl. No.: 569,301

[52] U.S. Cl. .................... 172/61; 47/1.43; 172/6; 172/59; 172/82; 172/106; 172/111; 172/522

[51] Int. Cl.² .................. A01B 41/04; A01B 41/06

[58] Field of Search ............... 47/1.43, 1.7; 172/5, 172/6, 38, 61, 83, 85, 86, 94, 99, 105, 106, 110, 111, 36, 81, 82, 97, 522, 526, 524, 523, 62

[56] References Cited

UNITED STATES PATENTS

| 315,400 | 4/1885 | Fowler | 172/111 X |
|---|---|---|---|
| 952,826 | 3/1910 | Ludwick | 172/111 X |
| 2,610,559 | 9/1952 | Peel | 172/106 X |
| 2,706,437 | 4/1955 | Sanders | 172/106 X |
| 2,713,816 | 7/1955 | Berg | 172/61 |
| 2,758,530 | 8/1956 | Gerbracht | 172/6 |
| 2,920,708 | 1/1960 | Berg | 172/111 |
| 3,095,045 | 6/1963 | Ennis et al. | 172/38 |
| 3,458,952 | 8/1969 | Ts Chudy, Jr. | 172/6 X |
| 3,512,587 | 5/1970 | Shader | 172/6 X |
| 3,525,403 | 8/1970 | Cayton et al. | 172/6 X |
| 3,533,474 | 10/1970 | Weeks | 172/6 |
| 3,776,316 | 12/1973 | Eberhart | 172/6 |

FOREIGN PATENTS OR APPLICATIONS

| 110,458 | 9/1964 | Czechoslovakia | 172/6 |
|---|---|---|---|
| 967,149 | 10/1950 | France | 172/111 |
| 984,3733 | 7/1951 | France | 172/94 |
| 1,176,911 | 8/1964 | Germany | 172/6 |
| 1,243,447 | 6/1967 | Germany | 172/5 |
| 687,641 | 2/1953 | United Kingdom | 172/5 |
| 264,277 | 2/1970 | U.S.S.R. | 172/6 |

Primary Examiner—Edgar S. Burr
Assistant Examiner—Steven A. Bratlie
Attorney, Agent, or Firm—Zarley, McKee, Thomte & Voorhees

[57] ABSTRACT

A cutting blade is carried on a shaft rotatable about an axis positioned adjacent a row crop. The blade extends across the longitudinal centerline of the row and cuts plants as the machine moves forward until a sensing means registering on forwardly positioned plants actuates the knife and causes it to rotate rearwardly along the row and away from the next plant in the row to be retained. The rotation continues until a knife portion is now positioned on the front side of the plant to be retained and a portion of the knife extends rearwardly along the side opposite the axis of rotation of the blade. The machine continuing to move forward will again clear plants from the row until the sensing means actuates the blade to rotate again thereby causing predetermined plants to be retained while plants inbetween are thinned out.

3 Claims, 7 Drawing Figures

U.S. Patent      July 5, 1977      4,033,416
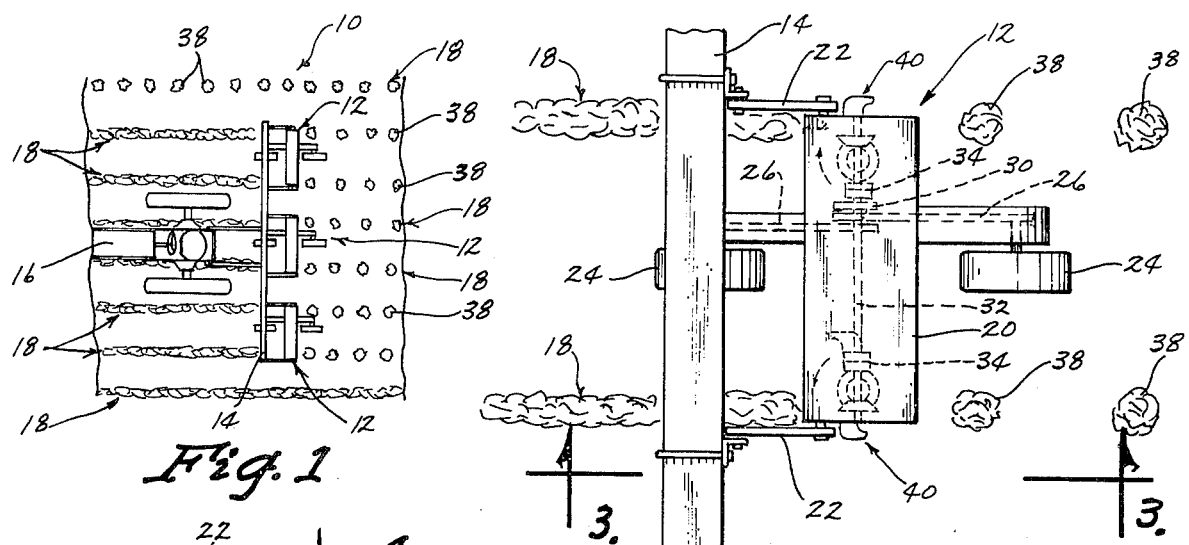
Fig. 1
Fig. 2
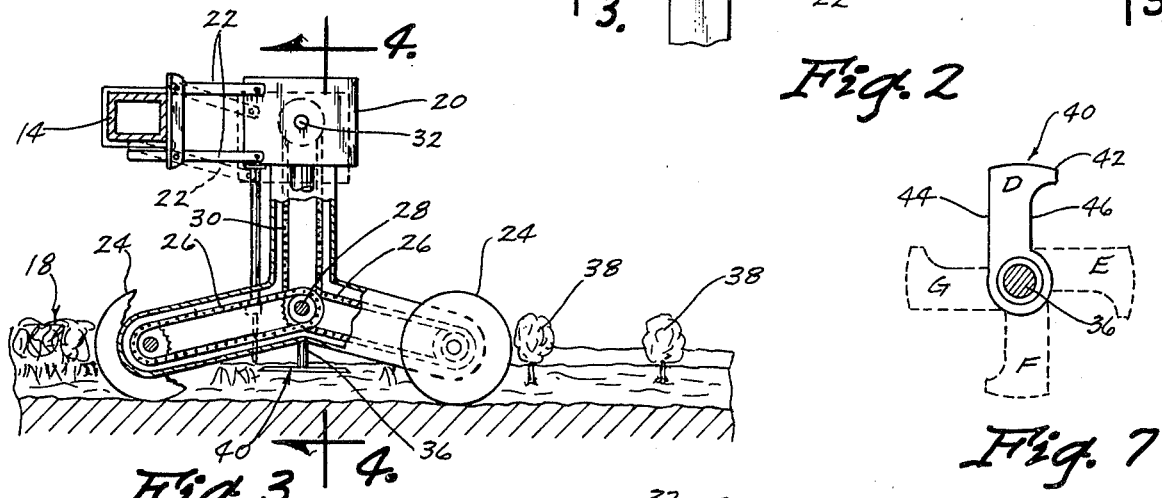
Fig. 3
Fig. 7
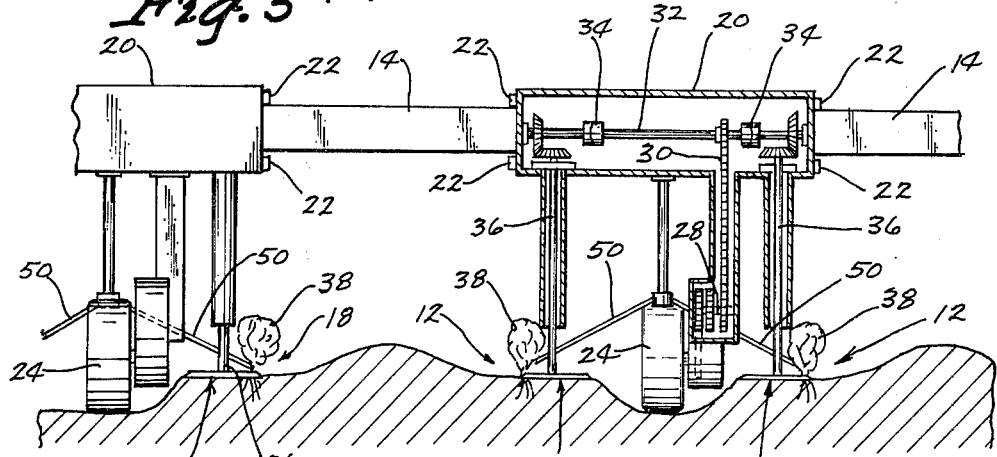
Fig. 4
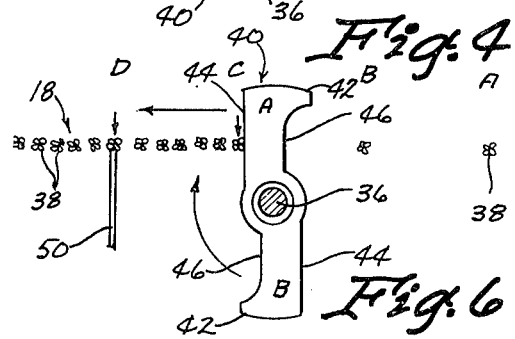
Fig. 6
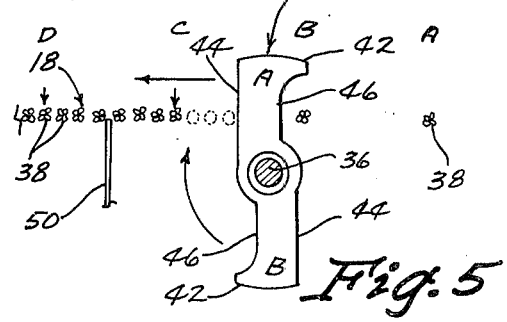
Fig. 5

BLADE MEANS FOR ROW CROP THINNING MACHINE

BACKGROUND OF THE INVENTION

Common methods of planting row crops include placing the seeds in hills spaced apart a predetermined distance or placing the seeds randomly in the row as in drilling. A problem with the drilling method, while it is simpler, is that the plants may be too closely spaced to provide optimum growth and crop production. Accordingly, suitable thinning procedures must be followed.

This invention relates to a device for thinning row crops which involves rotation of a cutting blade moving forwardly along the row of plants.

DESCRIPTION OF THE INVENTION

A tool bar will carry a plurality of units that include ground-engaging drive and gauge wheels. One or more vertically positioned shafts will be operably connected to the drive wheels through electrical solenoid clutches operably connected to sensing means registered on the plants in the row being worked. A cutting blade having one or more blade portions is mounted on the rotatable shaft which is rotatable about an axis adjacent the centerline of the row crop. The blade is positioned in the row and cuts plants as it moves forwardly. The sensing device at predetermined times actuates the clutch to operably connect the rotatable shaft to the drive wheels thereby causing the blade to rotate rearwardly away from the plant that is to be retained. The rotation continues until a blade portion is moved to the forward side of the plant to be retained. A portion on the blade extends rearwardly along the side opposite the vertical shaft thereby cleaning the area all around the plant. The machine continues to move forward thus causing the blade to clear further plants until the next plant to be retained is sensed and the blade again rotates rearwardly out of the row and then as the machine moves forwardly it rotates back into the row forwardly of the plant to be retained whereupon the procedure is repeated.

DESCRIPTION OF THE DRAWINGS.

FIG. 1 is a top plan view of the thinning machine of this invention in operation.

FIG. 2 is an enlarged in scale top view of a single unit having blades for thinning two adjacent rows.

FIG. 3 is a cross sectional view taken along line 3 — 3 in FIG. 2.

FIG. 4 is a cross sectional view taken along line 4 — 4 in FIG. 3.

FIG. 5 is a view showing the blade after having rotated 90° to a position with a blade portion positioned forwardly of the plant being retained.

FIG. 6 illustrates the blade positioned in the row just prior to being rotated.

FIG. 7 illustrates an alternate blade configuration including optionally one to four blade portions.

DESCRIPTION OF THE PREFERRED EMBODIMENT

The thinning machine of this invention is referred to in FIG. 1 generally by the reference numeral 10 and includes as illustrated three units 12 carried on a tool bar 14 connected to a tractor 16. The machine 10 works six rows 18 each trip across the field with each unit 12 working two rows.

Each unit 12 is provided with a gear box frame 20 pivotally connected to the tool bar 14 by oppositely mounted sets of parallel links 22 which allow the unit 12 to pivot vertically while remaining horizontally positioned.

A pair of longitudinally spaced apart gauge and drive wheels 24 are provided and include drive chains 26 connected to a common center laterally extending shaft 28 in turn connected to a vertically disposed drive chain 30 which extends upwardly to drive a shaft 32 in the gear box frame 20. The shaft 32 in turn through oppositely disposed electrically operated solenoid clutches 34 is adapted to drive vertical shafts 36 positioned adjacent plant rows 18 having individual plants 38.

The vertical drive shafts 36 are provided at their lower ends with a thinning knife or blade 40 having oppositely disposed blade portions A and B. Each blade portion includes at its outer end oppositely extending nose or hook portions 42. Each blade portion A and B is also provided with forward and rearward cutting edges 44 and 46, respectively.

The selective rotation of the blade 40 is accomplished by periodic actuation thereof as a result of an electrically charged wand 50 positioned to register on the plants 38 actuating the solenoid clutches 34 to cause the drive wheels 24 to operate the vertical shafts 36 and thereby cause the blade 40 to rotate 180° as illustrated in FIGS. 5 and 6 for a blade having two cutting portions A and B.

In FIGS. 5 and 6 the plants to be retained are indicated by the letters A, B, C and D and as illustrated are sensed by the wand 50. The blade upon rotation rotates in the direction indicated by the arrow while the machine moves forwardly to the left room FIG. 5 to FIG. 6 positions. In FIG. 5 the blade 40 has just completed a 180° turn positioning blade portion A on the forward side of plant B with the nose or hook portion 42 extending rearwardly along the plant. The blade portion 46 has cleared the opposite side of the plant between the shaft 36 and the plant. The rear side of the plant was cleared by the forward cutting edge 44 of the blade portion B just prior to the blade 40 being rotated since at that time the blade portion B was between plants A and B and cut away plants 38 between plants A and B being retained. The machine 10 moves forward continuously even during rotation of the blade 40 thus allowing for the blade to be on the rear side of the plant B at the start of the rotation and on the front side at the completion of the rotation. As the blade portion A moves into the row of plants the rear cutting edge 46 cuts away the plants indicated by the dash line representation and these same plants if they should remain will be acted upon by the forward cutting edge 44 of the blade portion A as the machine moves forwardly to the left. Upon the machine moving far enough the sensing wand 50 registers on the plant D thereby causing the solenoids 34 to be actuated whereupon the vertical drive shafts 36 are operably connected to the drive wheels 24 and the blade 40 is rotated 180° to the position of FIG. 5 but with the blade portion B now extending across the row 12. Prior to the rotation, however, as seen in FIG. 6, the forward cutting edge 44 of the blade portion A, has moved to closely adjacent the plant C whereupon as a result of the wand 50 registering on the plant D, rotation of the blade 40 begins causing further clearing between plants B and C by the rearward cutting edge 46 and the nose portion 42 while the rear cutting edge 46 and the nose portion 42 of the blade portion B will clear some of the plants between plants C and D followed by further clearing by the forward cutting edge 44 of the blade portion B as it moves from the left side of plant C to closely adjacent the right side of plant D whereupon the next rotation of 180° occurrs.

An alternate blade arrangement is seen in FIG. 7 which illustrates that one or more blade portions may be utilized as indicated by the solid line representation of a single blade D or three equally spaced radially disposed blades E, F and G may be used whereby each rotation requires turning the shafts only 45°. If a single blade D is used then each rotation would require rotating the blade through 360°.

I claim:

1. A row crop thinning machine comprising,
   a frame having a horizontally disposed rotatable blade rotatable about a vertical axis adjacent a row of plants, said blade being elongated and including front and rear substantially straight cutting edges and an outer free end, and said outer free end of said blade including a tail portion extending rearwardly and perpendicularly of said rear cutting edge through and beyond the vertical plane containing said rear cutting edge,
   means for moving said blade forwardly along said row with said blade being positioned in said row for cutting engagement of said front cutting edge with some of said plants,
   power means for intermittently rotating said blade rearwardly in said row for cutting engagement of said rear cutting edge with others of said row of plants and to a position in said row ahead of an uncut plant with said tail portion extending rearwardly along said uncut plant on the side of the uncut plant furthest from said vertical axis of rotation.

2. The structure of claim 1 wherein a second blade identical to said first blade is provided for rotation with said first blade about said vertical axis.

3. The structure of claim 2 wherein said second blade extends in the opposite direction from said first blade.

* * * * *